April 5, 1949.  J. W. CHAMBERLIN  2,466,153
STABILIZER FOR WASHING MACHINES
Filed Nov. 30, 1946
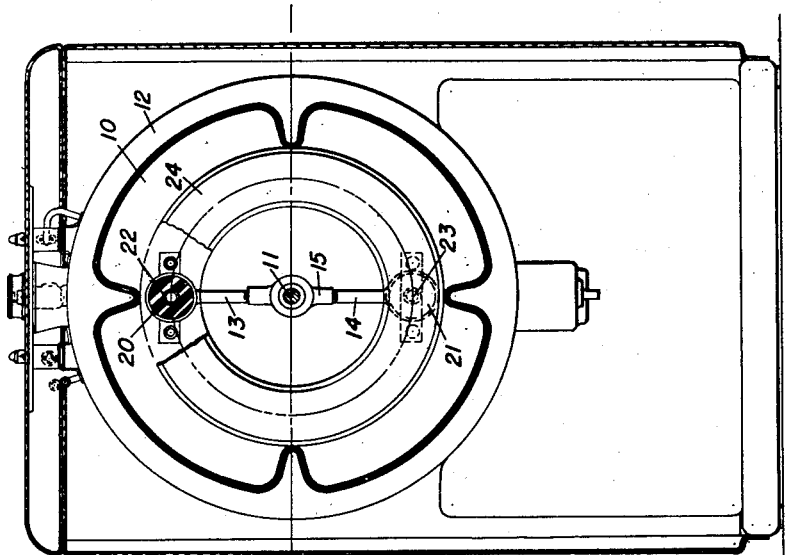
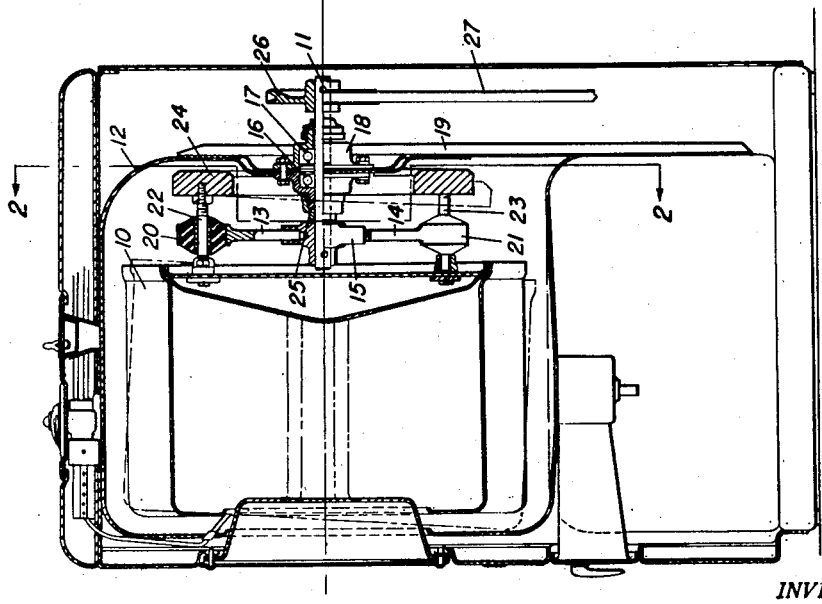
INVENTOR.
JOHN W. CHAMBERLIN
BY
M. W. Green.
ATTORNEY Patented Apr. 5, 1949

2,466,153

UNITED STATES PATENT OFFICE 2,466,153

STABILIZER FOR WASHING MACHINES

John W. Chamberlin, Mequon, Wis., assignor to Bendix Home Appliances, Inc., South Bend, Ind., a corporation of Delaware Application November 30, 1946, Serial No. 713,323

5 Claims. (Cl. 74—572)

1

This invention relates to stabilizing mechanism for an automatic washing and extracting machine of the type embodying a clothes containing cylinder mounted for rotation upon a horizontal axis.

It is a primary object of this invention to utilize a gyroscopic principle to stabilize a rotating clothes cylinder on its axis of rotation by providing a counter-balancing flywheel which is concentric with the shaft upon which the clothes cylinder is mounted and which is rotated in order to stabilize the vibration resulting from the spinning of the cylinder with such unbalance as may result from uneven distribution of the clothes in the cylinder.

It is a further object to provide resilient mounting for the clothes cylinder and flywheel to further aid in the absorption of vibration.

Still a further object is to provide a bearing of suitable width to support the shaft and the units mounted thereon with the clothes cylinder and counter-balancing flywheel being located on one side of the bearings and with driving means provided on the shaft on the other side of the bearings.

The above and other objects of the invention will be apparent from the following description and by reference to the accompanying drawings in which:

Figure 1 is a side view of the washing machine with a partial vertical section along the drive shaft showing the manner in which the various units are mounted upon the shaft.

Figure 2 is a rear view of the washing machine partly in section and on line 2—2 of Figure 1 showing the shock mounts and their supporting arms.

Referring to the drawings, a perforated clothes containing cylinder 10 is mounted for rotation upon a shaft 11 and is suspended inside a tub 12 by means of two rubber shock mount support arms 13 and 14 which are attached to a fitting 15 secured to the drive shaft 11. Two support bearings 16 and 17 support the shaft 11. These bearings 16 and 17 are enclosed in the bearing housing 18 which is supported by the rear wall of the tub 12 and by a bearing housing support bracket 19.

Two rubber shock mounts 20 and 21 are fixed on the ends of the shock mount support arms 13 and 14. These shock mounts 20 and 21 afford resilient support to the cylinder through the shock mount support arms 13 and 14.

Two bolts 22 and 23 are attached to the back wall of the cylinder 10 and pass through the

2 rubber shock mounts 20 and 21 with the opposite extremities of the bolts where they extend beyond the shock mounts being attached to a counter-balancing flywheel 24. These two bolts constitute the primary support of the flywheel 24, there being no other connection between the flywheel 24 and the shaft 11.

One end of the shaft 11 carries the shock mount support arms 13 and 14 attachment being effected by the fitting 15, while the other end extends beyond the tub 12. Water leakage from the tub along the shaft is restricted by the drive shaft seal 25. A pulley 26 is mounted on the end of the drive shaft 11 which is outside the tub 12. A drive motor not shown is provided in the base of the machine to drive the pulley 26 through the belt 27. Both the flywheel 24 and the cylinder 10 together with the shock mounts 20 and 21 are inside the tub 12. Also these elements are all on the same side of the bearing assembly 17 and 18 and the drive pulley 26 is on the opposite side of the supporting bearing 17, 18 and on the outside of the tub.

In operation this machine makes use of the rotating flywheel and its action as a gyroscope to stabilize the clothes cylinder 10 on its axis of rotation. After the washing and rinsing of the clothes has been completed, the speed of rotation of the cylinder is substantially increased in order to effect the extraction of the water from the contained clothes through the perforations in the cylinder by centrifugal force. It is during this extraction period that the greatest amount of vibration occurs and in order to counteract such vibration the heavy flywheel 24 is provided. As the clothes cylinder 10 rotates at a high rate of speed for extraction, the flywheel 24 rotates with the cylinder at an equal speed. The cylinder 10 and the flywheel 24 are both supported on the resilient rubber shock mounts 20 and 21, the cylinder being on one side of the resilient support and the flywheel 24 being on the opposite side. Thus during rotation if there is a disturbing force created by an out of balance load in the cylinder, the fact that there is a resilient mounting of the cylinder and flywheel will allow tilting of the cylinder and flywheel in the shock mounts 20 and 21. And the fact that the movement of the cylinder in one direction will cause movement of the flywheel in the opposite direction will tend to cause a stabilizing force to be set up due to the gyroscopic effect of the rotating flywheel 24.

The combined effect of the counter-balancing flywheel and the resilient mounting for the clothes cylinder reduces the vibration effect of unbalanced clothes load and permits higher speed of rotation during the extraction period to be used than would otherwise be practical, thus insuring quicker and more efficient extraction of water from the contained clothes.

While one particular machine has been described herein, it is not intended to limit the scope of the invention by that description or otherwise than by the terms of the appended claims:

I claim:

1. A combined washing and extracting machine comprising a substantially horizontal shaft, a clothes containing cylinder, a counter-balancing flywheel, resilient support arms carried by said shaft, and connections from said support arms for resiliently suspending both said cylinder and flywheel from each of said support arms for rotation with said shaft but on opposite sides of said support arms axially of said shaft.

2. A combined washing and extracting machine which comprises a clothes containing cylinder, a counter-balancing flywheel, support arms which extend outwardly and perpendicularly from said shaft, shock absorbers mounted upon the ends of said arms, means to connect said shock absorbers to said cylinder in order to afford resilient support to said cylinder, means to support said flywheel for rotation concentric with said shaft suspended also on said shock absorbers but on the opposite side of said shock absorbers from said cylinder thereby to stabilize said cylinder.

3. A combined washing and extracting machine which comprises a clothes containing cylinder, a substantially horizontal shaft, a counter-balancing flywheel mounted concentric with said shaft and which rotates with said cylinder and shaft in order to stabilize said cylinder on its axis of rotation, support arms which extend outwardly and perpendicular from said shaft, shock absorbers mounted upon the ends of said arms, support members extending completely through said shock absorbers along a line parallel to said shaft extending on both sides of said shock absorbers, means connecting said support members on one side of said shock absorbers with said cylinder for rotation with said shaft, and further connecting means on the opposite side of said shock absorbers for connecting said flywheel also for rotation with said shaft.

4. A combined washing and extracting machine which comprises a clothes containing cylinder, a counter-balancing flywheel, support arms which extend from said shaft, shock absorbers mounted upon said arms, means to connect said shock absorbers to said cylinder to afford resilient support to said cylinder, means to resiliently support said flywheel on the opposite side of said support arms and shock absorbers from said cylinder thereby to stabilize said cylinder.

5. A combined washing and extracting machine comprising a clothes containing cylinder, a shaft for driving said cylinder, a counter balancing flywheel mounted concentric with but not directly connected to said shaft, a shock absorbing unit resiliently connecting said cylinder with said shaft and also resiliently connecting said flywheel and said cylinder thereby to stabilize said cylinder.

JOHN W. CHAMBERLIN.

REFERENCES CITED

The following references are of record in the file of this patent:

UNITED STATES PATENTS

| Number | Name | Date |
|---|---|---|
| 2,361,266 | Clark | Oct. 24, 1944 |